Jan. 13, 1959     L. E. HILL     2,867,894
MAGNETICALLY ENCLOSED COIL
Filed Nov. 29, 1954
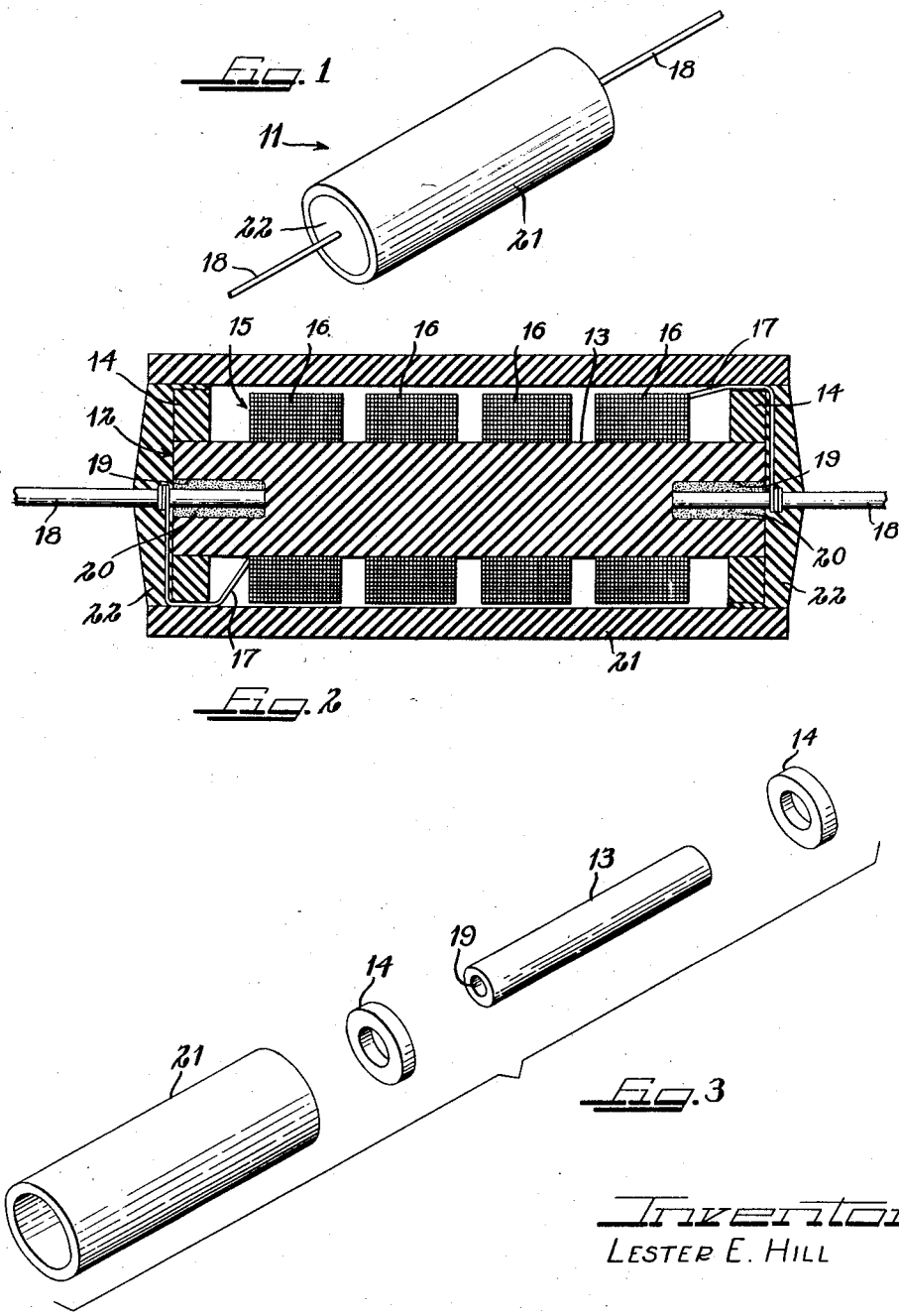
Inventor
LESTER E. HILL
Ooms, McDougall, Williams & Hersh
Attys.

2,867,894
Patented Jan. 13, 1959

2,867,894
MAGNETICALLY ENCLOSED COIL

Lester E. Hill, Nashville, Tenn., assignor to Aladdin Industries, Incorporated, Nashville, Tenn., a corporation of Illinois Application November 29, 1954, Serial No. 471,780

6 Claims. (Cl. 29—155.56)

One principal object of the invention is to provide an improved inductance coil having a closed magnetic circuit.

A further object is to provide an improved coil of the foregoing character which may be employed to advantage as a choke at high radio frequencies.

Another object of the invention is to provide an improved radio frequency coil which is completely enclosed magnetically and hence is efficient and well shielded.

It is a further object of the invention to provide an improved coil which has a closed magnetic circuit, yet is simple in construction and extremely inexpensive to manufacture.

Another object is to provide an improved magnetically enclosed choke coil which provides an extremely high inductance, yet has an extremely low resistance.

Further objects and advantages of the invention will appear from the following description, taken with the accompanying drawings, in which:

Figure 1 is a perspective view of a magnetically enclosed coil constituting an illustrative embodiment of the invention;

Fig. 2 is an enlarged longitudinal sectional view of the coil shown in Fig. 1; and Fig. 3 is an exploded perspective view of some of the components forming the magnetic circuit of the coil.

If the drawings are considered in greater detail, it will be seen that they illustrate an exemplary inductance coil 11 which is well adapted for use as a choke coil at high radio frequencies.

To provide a magnetic circuit having high permeability, the coil 11 includes a spool 12 which is preferably made of a bonded finely divided magnetic material so that the spool will be magnetic yet electrically insulating. It will be seen that the spool 12 comprises a cylindrical rod-like core 13 fitted at its opposite ends with disk-like flanges 14.

The conductive or current carrying element of the coil 11 is formed by a winding 15 carried on the core 13. In this instance, the winding 15 comprises a plurality of spaced annular plies 16 which may be universally or otherwise wound in the conventional fashion. As is well known, this arrangement of the winding 15 minimizes the distributed capacitance of the coil. Leads 17 are brought out from the opposite ends of the winding 15 and are soldered or otherwise connected to terminal or end leads 18 in the form of short lengths of relatively stiff wire received in recesses 19 formed in the ends of the core 13. Annular solder masses 20 are disposed in the recesses 19 around the terminal leads 18 to anchor the leads in the recesses. The solder is flowed into the recesses around the wires 18 during the course of the assembly of the coil 11.

Provision is made for magnetically enclosing the spool 12 and the winding 15. To this end the spool 12 is received within an elongated sleeve 21 which is tubular and cylindrical, as illustrated. It will be understood that the inside diameter of the sleeve 21 is made sufficient to receive the spool 12 and the winding 15 with a free fit. Preferably, the length of the sleeve 21 is made somewhat greater than the length of the spool 12. As in the case of the spool 12, the sleeve 21 is made of a bonded finely divided magnetic material so that the sleeve will be magnetic yet electrically insulating.

The ends of the sleeve 21 are sealed by magnetic, electrically insulating plugs or masses 22 which also serve to form magnetic bridges between the ends of the spool 12 and the sleeve 21. Accordingly, the winding 15 is completely enclosed within a sheath of magnetic material. The magnetic sealing masses 22 may be composed of finely divided or powdered magnetic material carried in a suitable binder such as a polyester or other resinous plastic. It is preferred to add the magnetic sealing plugs 22 by flowing or otherwise introducing the magnetic material into the ends of the sleeve 21 with the binder in a liquid or plastic state. A solvent or other plasticizer may be employed to soften the binder. After the sealing plugs 22 are in place, the binder may be cured, preferably with the aid of heat. It will be appreciated that the masses 22 hermetically seal the winding 15. Moreover, the material of the end masses 22 flows between the ends of the sleeve 21 and the disk flanges 14 so that the magnetic circuit for the winding 15 will be completely closed.

In manufacturing the exemplary coil 11, the spool 12 and the sleeve 21 may be made of any suitable bonded finely divided magnetic material. However, it is preferred to form the spool 12 and the sleeve 21 of nickel ferrite and cobalt ferrite, along with other materials added in minor quantities, generally as disclosed and claimed in the Berge Patents Nos. 2,640,813, 2,656,319, and 2,659,698. The additive materials may include zinc ferrite, vanadium ferrite, zinc oxide, vanadium oxide, iron oxide, magnesium zirconate, and lead titanate, in various small proportions. These ferrite based mixtures provide high magnetic permeability, high inductance with a minimum of wire in the coil, high "Q" or factor of merit, low eddy current, and other losses, and low thermal drift in the finished magnetic members.

It is preferred to make the spool 12 by molding the core 13 from a suitable ferrite mixture, prefiring the core, molding the disks 14, mounting the disks on the ends of the core, and refiring the assembly. It has been found that the disks 14 shrink to a greater extent than the prefired core 13 during the final firing, with the result that the disks and the core are intimately engaged and firmly united in the finished spool 12.

While the ferrite mixture for molding the core 13 may vary in composition, as discussed in the above mentioned Berge patents, the mixture may comprise, for example, approximately equal parts by weight of finely divided or powdered nickel ferrite and cobalt ferrite. Either of the ferrites may be in excess of the other up to about 25 percent. In addition, the exemplary mixture may contain a small amount, up to about 12 percent by weight, of finely divided magnesium zirconate, a small amount, up to about 15 percent by weight, of powdered zinc oxide, a small amount, up to about 10 percent by weight, of powdered vanadium oxide, a sufficient amount of finely divided iron oxide to react with the zinc and vanadium oxides to form the corresponding ferrites, and a small amount, up to about 10 percent by weight, of a temporary organic binder. Any binder having suitable adhesive properties may be employed. For example, the binder may be selected from the phenol-aldehydes, melamine-aldehydes, urea-aldehydes, vinyl polymers and copolymers, polyacrylates, polystyrenes, polyesters, and rubber based materials. The binder may be made fluid or plastic with a suitable solvent. About three percent by weight of the binder is usually sufficient.

The core 13 is formed by molding the mixture under high pressure into the desired shape. At this point, the core 13 is fired for about one-half to two hours at a temperature in the range between about 1800 and 2500 degrees Fahrenheit, and preferably in excess of 2000 degrees Fahrenheit. The firing burns away the temporary binder, but develops a bond between the other ingredients. After the core 13 has been cooled, the molded but unfired end disks 14 are slipped over the ends of the core and the assembly is refired in the same temperature range, but preferably this time to a temperature of 2350 degrees Fahrenheit. Differential shrinkage occurs between the disks or rings 14 and the core 13, with the rings shrinking more than the core, due to the prefiring of the core. The amount of shrinkage of the core in the second firing is inversely related to the prefiring temperature, particularly in the range from 2000 to 2500 degrees Fahrenheit. If the prefiring temperature is much below 2000 degrees Fahrenheit, the shrinkage of the core in the second firing tends to be about the same as if it had not been prefired. By virtue of the two-stage firing, the end disks are united to the core with surprising firmness.

After the spool 12 has been completed, the winding 15 is wound on the core 13. Moreover, the end leads 18 are inserted into the recesses 19 and solder is flowed into the recesses to anchor the leads. The ends of the winding 15 are soldered to the leads 18.

Next, the sleeve 21 is slipped over the spool 12. To form the plugs 22, finely powdered ferrite material, carried in a suitable binder, is applied to the ends of the sleeve 21. The ferrite material may be similar to that in the finished core 13. Any suitable binder, such as a polyester resin, for example, may be employed. The ferrite material is applied to one end of the sleeve 21 first, and then the binder is cured, preferably at an advanced temperature of about 125 degrees centigrade. The coil 11 is then inverted so that the ferrite material may be applied to the opposite end of the sleeve 21. A second curing operation follows. It will be understood that the plastic ferrite material flows into the interstices between the end disks 14 and the sleeve 21. Thus the finished end plugs 22 completely fill the ends of the sleeve 21 and cover the ends of the spool 12. Accordingly, the winding 15 is hermetically sealed and magnetic bridges are formed between the sleeve and the ends of the spool 12. In this way, the coil 11 is provided with a completely closed magnetic circuit. Moreover, the winding 15 is effectively shielded magnetically.

Due to the chemical nature and the finely divided character of the material in the magnetic circuit, the coil 11 may be employed as an effective choke coil or inductance element at high radio frequencies. Because of the insulating nature of the magnetic material, the coil may be employed at high voltages, such as 10,000 volts, for example.

It will be apparent that the winding may be wound by inexpensive simple methods. Moreover, the parts of the magnetic circuit may be easily and inexpensively made and assembled. Accordingly, the cost of the coil as a whole is extremely low.

Various modifications, alternative constructions and equivalents may be employed without departing from the true spirit and scope of the invention as exemplified in the foregoing description and defined in the following claims.

I claim:

1. A method of making a magnetically enclosed coil, said method comprising molding finely divided magnetic ferrite material with a resinous binder into a rod-like cylindrical core having axial recesses in its opposite ends, firing said core to a temperature in excess of 2000 degrees Fahrenheit but less than 2350 degrees Fahrenheit, molding finely divided magnetic ferrite material with a resinous binder into a pair of apertured disks, each of said disks having an aperture therein of a size substantially the same as the ends of said fired core to make a close slip fit thereover, slipping said disks over the ends of said core, shrinking said disks onto said core by refiring said core and said mounted disks to a temperature of about 2350 degrees Fahrenheit, molding finely divided magnetic ferrite material with a resinous binder into a cylindrical sleeve, firing said sleeve, winding wire in a coil on said core, inserting end leads into said recesses, connecting the ends of said wire to said end leads, flowing solder into said recesses to anchor said leads, mounting said sleeve around said winding, core and disks, flowing finely divided magnetic ferrite material with a polyester resinous binder into the ends of said sleeve over and around said disks to seal in said winding and form magnetic bridges between said sleeve and said disks, and curing said polyester binder at a temperature of about 125 degrees centigrade.

2. A method of making a magnetically enclosed coil, said method comprising molding a finely divided magnetic ferrite mixture with a binder into a rod-like core, firing said core to a temperature in the range from 1800 to 2500 degrees Fahrenheit until shrinkage is observed, molding a finely divided magnetic ferrite mixture with a binder into a pair of apertured flange members, each of said flange members having an aperture therein of a size substantially the same as the ends of said fired core to make a close slip fit thereover, slipping said members over the ends of said core, shrinking said flange members onto said core by firing said core and said mounted members to a temperature in said range until shrinkage of said flange members is observed, molding a finely divided magnetic ferrite mixture with a binder into a sleeve, firing said sleeve, winding wire in a coil on said core, mounting said sleeve around said coil, core, and flange members while bringing out the ends of said coil between said sleeve and said flange members and flowing finely divided magnetic ferrite material carried in a binder between each flange member and the corresponding end of said sleeve to seal in said coil and form magnetic bridges between the ends of said sleeve and said flange members.

3. A method of making a magnetically enclosed coil, said method comprising molding finely divided magnetic ferrite material with a binder into a rod-like core, firing said core to a temperature in the range from 1800 to 2500 degrees Fahrenheit until shrinkage is observed, molding finely divided magnetic ferrite material with a binder into a pair of apertured flange members, each of said flange members having an aperture therein of a size substantially the same as the ends of said fired core to make a close slip fit thereover, slipping said flange members over the ends of said core, shrinking said flange members onto said core by refiring said core and said mounted flange members to a temperature in said range until shrinkage of said flange members is observed, molding finely divided magnetic ferrite material with a binder into a sleeve, firing said sleeve, winding wire in a coil on said core, mounting said sleeve around said coil, core, and flange members while bringing out the ends of said coil between said sleeve and said flange members, flowing finely divided magnetic ferrite material with a binder onto the ends of said sleeve, core, and flange members to seal in said winding and form magnetic bridges between said sleeve and said flange members.

4. A method of making a coil, said method comprising molding finely divided magnetic ferrite material with a resinous binder into a rod-like cylindrical core having axial recesses in its opposite ends, firing said core to a temperature in the range from 1800 to 2500 degrees Fahrenheit until shrinkage is observed, molding finely divided magnetic ferrite material with a resinous binder into a pair of apertured disks, each of said disks having an aperture therein of a size substantially the same as the ends of said fired core to make a close slip fit thereover, slipping said disks over the ends of said core, shrinking said disks onto said core by refiring said core and said mounted disks to a temperature in said range until shrinkage of said disks is observed, molding finely divided magnetic ferrite material with a resinous binder into a cylindrical sleeve, firing said sleeve, winding wire in a coil on said core, inserting end leads into said recesses, connecting the ends of said wire to said end leads, flowing solder into said recesses to anchor said leads, mounting said sleeve around said winding, core and disks, flowing finely divided magnetic ferrite material with a binder into the ends of said sleeve over and around said disks to seal in said winding and form magnetic bridges between said sleeve and said disks, and curing said binder.

5. A method of making a magnetic spool, said method comprising molding a finely divided magnetic ferrite mixture with a binder into a rod-like core of circular cross-section, firing said core to a temperature in the range from 1800 to 2500 degrees Fahrenheit until shrinkage is observed, molding a finely divided magnetic ferrite mixture with a binder into a pair of apertured annular flange members, each of said flange members having an aperture therein of a size substantially the same as the ends of said fired core to make a close slip fit thereover, slipping said members over the ends of said core, shrinking said flange members onto said core by refiring said core and said mounted members to a temperature in said range degrees Fahrenheit until shrinkage of said flange members is observed.

6. A method of making a rigid magnetic member of circular cross-section with an annular flange thereon, said method comprising molding finely divided magnetic ferrite mixture with a resinous binder into an inner element of circular cross-section and an outer annular flange element, prefiring the inner element to a temperature in the range from 1800 to 2500 degrees Fahrenheit until shrinkage is observed, cooling the inner element, said outer element having an aperture therein of substantially the same size as said prefired inner element to make a close slip fit thereover, slipping the outer element around the inner element, and shrinking said outer element onto said inner element by firing the elements to a temperature in said range until shrinkage of said outer element is observed.

References Cited in the file of this patent

UNITED STATES PATENTS

| | | |
|---|---|---|
| 1,164,739 | Mershon | Dec. 21, 1915 |
| 1,742,018 | Wermine | Dec. 31, 1929 |
| 1,775,981 | Warner | Sept. 16, 1930 |
| 1,991,143 | Ehlers | Feb. 12, 1935 |
| 2,544,152 | Gusdorf et al. | Mar. 6, 1951 |
| 2,567,394 | Nuttman | Sept. 11, 1951 |